Feb. 7, 1933.  H. P. DORN  1,896,292

VEHICLE STEERING GEAR

Filed Dec. 4, 1931

INVENTOR

Harry P. Dorn by
Brockett Hyde Higley & Meyer
Attorneys

Patented Feb. 7, 1933

1,896,292

UNITED STATES PATENT OFFICE

HARRY P. DORN, OF CLEVELAND, OHIO

VEHICLE STEERING GEAR

Application filed December 4, 1931. Serial No. 578,916.

This invention relates to steering gear for automotive or other vehicles, and more particularly relates to that class of energy-absorbing devices designed to control the periodical wheel motion known in the art as "shimmying", and generally to control abnormal vibrational wheel motion set up by road shock or other running conditions and which would otherwise be transmitted to other vehicle parts to the discomfort or danger of operator or passengers.

An object of this invention is to provide a device which will have the desired effect and which may be incorporated in the steering gear as an integral part thereof rather than as an attachment as has been usual heretofore in the art.

Another object is to provide such a device in a simple and most elementary form and hence at a minimum of expense, and yet in a form inherently adapted to function with perfect reliability.

Figure 1:
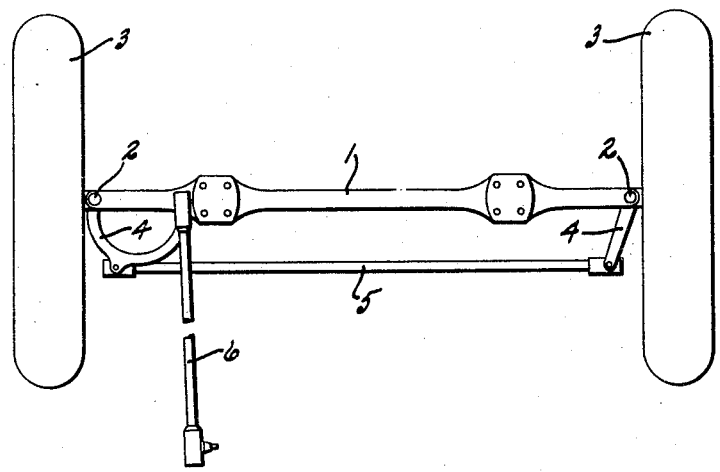
Figure 2:
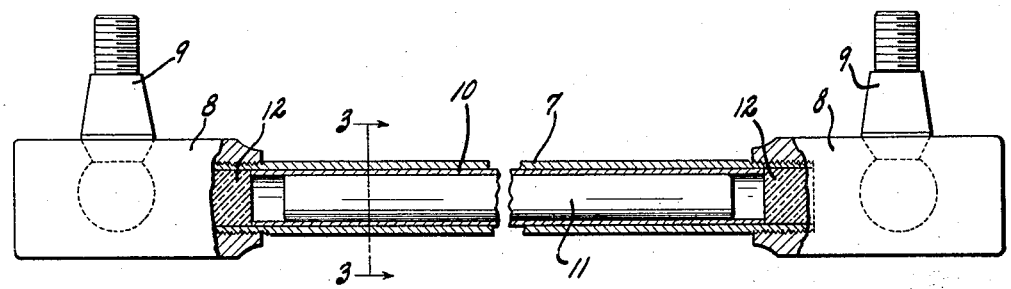
Figure 3:
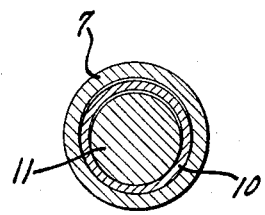

The exact nature of this invention together with further objects and advantages thereof will be apparent from the following description taken in connection with the accompanying drawing, in which Fig. 1 is a plan view of pertinent parts of an automobile steering gear; Fig. 2 is an enlarged detail of parts appearing in Fig. 1; and Fig. 3 is an enlarged section of parts appearing in Fig. 2 as in the plane of line 3—3 of the latter.

With reference now to the drawing, 1 represents the front axle of an automotive vehicle, having the usual steering knuckles 2 by which the wheels 3 may have steering motion. Arms 4 extend rearwardly from the knuckles 2 and are connected by a tie-rod or cross tube 5, so that the wheels are joined together for common steering control. A reach rod or drag link 6 provides connection between one of the arms 4 and the steering arm which is controlled by the operator; the rods 5 and 6 having ball and socket or other swinging connection with their immediately associated parts, all as is well known in the art.

It will be observed that both the rods 5 and 6 have longitudinal motion when the wheels have steering motion.

According to my invention one or both of the rods 5 and 6 are made tubular so as to provide an elongated hollow therewithin. Thus, as shown in Fig. 2, the principal parts of the rod may be the tubular member 7 having, secured on its ends so as to close the latter, the members 8 which provide the sockets in which the ball members 9 seat, whereby the rod has connection with the parts which it operates or by which it is operated.

Within the member 7 I provide a tubing 10 of material having a relatively high coefficient of friction such as fiber. Within the member 10 I provide an inertia element 11 of solid metal and thus of substantial weight. The fit of the member 11 in the member 10 is preferably loose as indicated in Fig. 3, so that the inertia element may move freely therein. The length of the inertia element is such that it may have some endwise movement in the hollow of the rod, and I have found that about two inches of such movement is desirable.

It is desirable that some cushioning effect be provided as the inertia element impacts at the end of its stroke. For this purpose I provide means such as the blocks of rubber 12 fitting the opening of the member 7 and positioned each between the adjacent member 8 and corresponding end of the tube 10.

It will be obvious that while the inertia element may have limited relative longitudinal motion in the hollow of the rod, yet since the tube 10 bears between the inertia element and the member 7. there will be considerable frictional resistance to such motion. Therefore, when the vehicle is in motion and when there is a tendency to vibration in the wheels, this friction will tend to absorb the force of the vibration. The vibration will be evidenced in the rod by a longitudinal motion of the latter, the inertia of the element 11 will tend to maintain the latter stationary, and the friction of the relative motion between these parts will absorb the energy of vibration. At least it will absorb enough of the energy so that the amplitude of vibration does not increase to an annoying or dangerous amount as it otherwise would. Similarly, upon road shock, as when one or both wheels are run over an obstruction resulting in a tendency to turning action in the steering gear, a certain portion of this turning force will be absorbed.

And, while the entire device is of extreme simplicity as described, it will always certainly function, and quietly, since the tube 10 is of nonmetallic material.

What I claim is:

1. In a steering gear for vehicles, a rod associated with a wheel for longitudinal movement upon steering adjustment of said wheel, said rod having a longitudinally extending hollow, and an inertia element of substantial mass arranged within said hollow for limited relative movement therealong.

2. In a steering gear for vehicles, a rod associated with a wheel for longitudinal movement upon steering adjustment of said wheel, said rod having a longitudinally extending hollow, an inertia element of substantial mass arranged within said hollow for limited relative movement therealong, and friction means arranged to bear between said inertia element and the wall of said hollow, in opposition to said movement.

3. In a steering gear for vehicles, a rod associated with a wheel for longitudinal movement upon steering, adjustment of said wheel, said rod having a longitudinally extending hollow, a tubular element of friction material arranged along said hollow, and an inertia element of substantial mass arranged within said tubular element, said hollow being longer than said inertia element whereby the latter may have limited relative movement along said rod.

4. In a steering gear for vehicles, a rod associated with a wheel for longitudinal movement upon steering adjustment of said wheel, said rod having a longitudinally extending hollow, an inertia element of substantial mass arranged within said hollow for relative movement therealong, and means within said hollow for receiving with cushioning effect the impact between the moving parts.

In testimony whereof I hereby affix my signature.

HARRY P. DORN.